(12) United States Patent
Talebiesfandarani et al.

(10) Patent No.: US 12,537,189 B2
(45) Date of Patent: Jan. 27, 2026

(54) SYSTEMS AND METHODS FOR ADHESION OF ELECTRODES

(71) Applicant: Rivian IP Holdings, LLC, Plymouth, MI (US)

(72) Inventors: Majid Talebiesfandarani, San Jose, CA (US); Soo Kim, Fremont, CA (US); Sookyung Jeong, San Jose, CA (US); Tae Kyoung Kim, Albany, CA (US); Ki Tae Park, Santa Clara, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 575 days.

(21) Appl. No.: 18/054,599

(22) Filed: Nov. 11, 2022

(65) Prior Publication Data

US 2024/0162416 A1 May 16, 2024

(51) Int. Cl.
| | |
|---|---|
| *H01M 4/00* | (2006.01) |
| *H01M 4/04* | (2006.01) |
| *H01M 4/36* | (2006.01) |
| *H01M 4/58* | (2010.01) |
| *H01M 4/02* | (2006.01) |

(52) U.S. Cl.
CPC ......... *H01M 4/366* (2013.01); *H01M 4/0404* (2013.01); *H01M 4/5825* (2013.01); *H01M 2004/021* (2013.01); *H01M 2004/028* (2013.01)

(58) Field of Classification Search
CPC .......................... H01M 4/366; H01M 4/5825
See application file for complete search history.

(56) References Cited

FOREIGN PATENT DOCUMENTS

| CN | 114270564 A | * | 4/2022 | ........ H01M 10/0525 |
| EP | 3349274 A1 | * | 7/2018 | .......... H01M 4/0404 |

OTHER PUBLICATIONS

Kim, Electrode Having Two-Layer Structure and Method for Manufacturing Same, Jul. 2018, See the Abstract. (Year: 2018).*
Miyamae et al, Lithium Secondary Battery, Apr. 2022, See the Abstract. (Year: 2022).*

* cited by examiner

*Primary Examiner* — Tiffany Legette
*Assistant Examiner* — Monique M Wills
(74) *Attorney, Agent, or Firm* — Foley & Lardner LLP

(57) ABSTRACT

Provided herein is an electrode. The electrode can include a current collector. The electrode can include a first layer on a first surface of the current collector. The first layer can include a first electrode active material and an electrically conductive material. The electrode can include a second layer on the first layer. The second layer can include a second electrode active material. An amount of the second electrode active material in the second layer can be greater than an amount of the first electrode active material in the first layer.

20 Claims, 10 Drawing Sheets

SYSTEMS AND METHODS FOR ADHESION OF ELECTRODES

INTRODUCTION

Batteries can have different power capacities to charge and discharge power to operate machines.

SUMMARY

Increased carbon weight percentage as a conductive surface coating in an electrode active material can decrease the power density of the battery and reduce adhesion between the electrode active material and the current collector. The solutions described herein can provide an electrode including a layer between the electrode active material and the current collector. The layer can include an electrode active material.

At least one aspect is directed to an electrode. The electrode can include a current collector. The electrode can include a first layer on a first surface of the current collector. The first layer can include a first electrode active material and an electrically conductive material. The electrode can include a second layer on the first layer. The second layer can include a second electrode active material. An amount of the second electrode active material in the second layer can be greater than an amount of the first electrode active material in the first layer.

At least one aspect is directed to a method. The method can include providing a current collector. The method can include disposing a first layer on a first surface of the current collector. The first layer can include an electrode active material and an electrically conductive material. The method can include disposing a second layer on the first layer. The second layer can include a second electrode active material. An amount of the second electrode active material in the second layer can be greater than an amount of the first electrode active material in the first layer.

At least one aspect is directed to an electric vehicle. The electric vehicle can include a battery cell. The battery cell can include an anode. The battery cell can include a cathode. The cathode can include a current collector. The cathode can include a first layer on a first surface of the current collector. The first layer can include a first cathode active material and an electrically conductive material. The cathode can include a second layer on the first layer. The second layer can include a second cathode active material. An amount of the second cathode active material in the second layer can be greater than an amount of the first cathode active material in the first layer.

At least one aspect is directed to a battery. The battery can include an anode. The battery can include a cathode. The cathode can include a current collector. The cathode can include a first layer on a first surface of the current collector. The first layer can include a first cathode active material and an electrically conductive material. The cathode can include a second layer on the first layer. The second layer can include a second cathode active material. An amount of the second cathode active material in the second layer can be greater than an amount of the first cathode active material in the first layer.

At least one aspect is directed to a system. The system can include a battery cell. The battery cell can include an anode. The battery cell can include a cathode. The cathode can include a current collector. The cathode can include a first layer on a first surface of the current collector. The first layer can include a first cathode active material and an electrically conductive material. The cathode can include a second layer on the first layer. The second layer can include a second cathode active material. An amount of the second cathode active material in the second layer can be greater than an amount of the first cathode active material in the first layer.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for improved adhesion of electrodes. The various concepts introduced above and discussed in greater detail below may be implemented in any of numerous ways.

The present disclosure is directed to systems and methods for improved adhesion of electrodes. An electrically conductive coating such as a carbon coating can be incorporated at the surface of an electrode active material. The electrode active material can be olivine-type $LiFePO_4$ or $LiMn_{1-x}Fe_xPO_4 (0.1 \leq x \leq 0.5)$ cathode material. However, increased carbon weight percentage in the surface coating can decrease the power density of the battery and reduce adhesion between the electrode made with the electrode active material and the current collector. Reduced adhesion can lead the electrode active material to peel off of the current collector. Increased binder content in the coating to compensate for reduced adhesion can decrease the energy density of the battery.

Systems and methods of the present technical solution can provide an electrode including a layer between the electrode active material and the current collector. The electrode can include a current collector. The electrode can include a first layer on a first surface of the current collector. The first layer can include a first electrode active material and an electrically conductive material. The electrode can include a second layer on the first layer. The second layer can include a second electrode active material. An amount of the second electrode active material in the second layer can be greater than an amount of the first electrode active material in the first layer.

The disclosed solutions have a technical advantage of improving battery cell performance. The solutions can reduce of prevent the second layer from separating or peeling off the current collector. The first layer can improve the electrical conductivity between the second layer and the current collector by reducing the electrical resistivity of the electrode.

Figure 1:
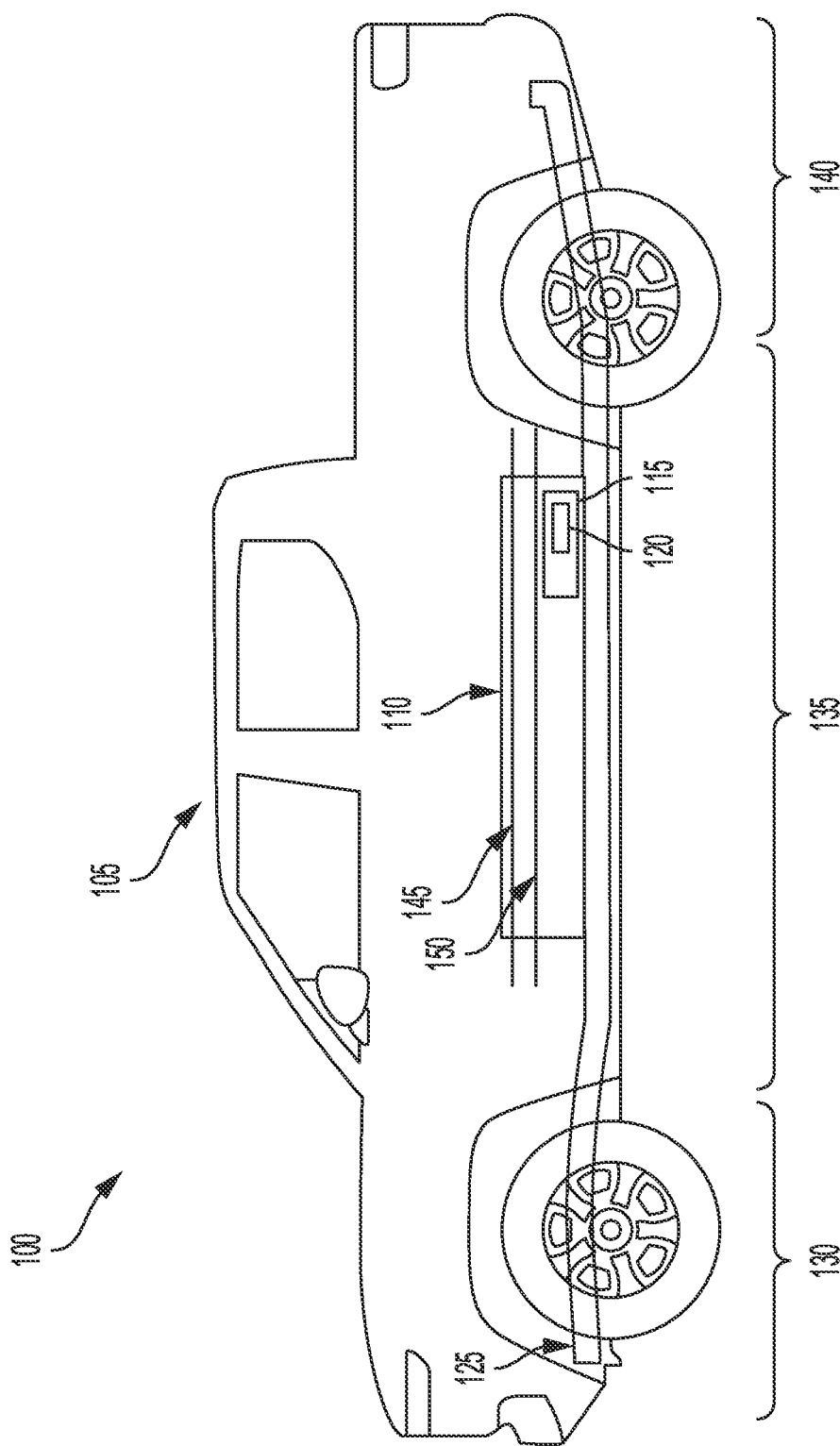
FIG. 1 depicts a cross-sectional view of an electric vehicle, according to an example implementation.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
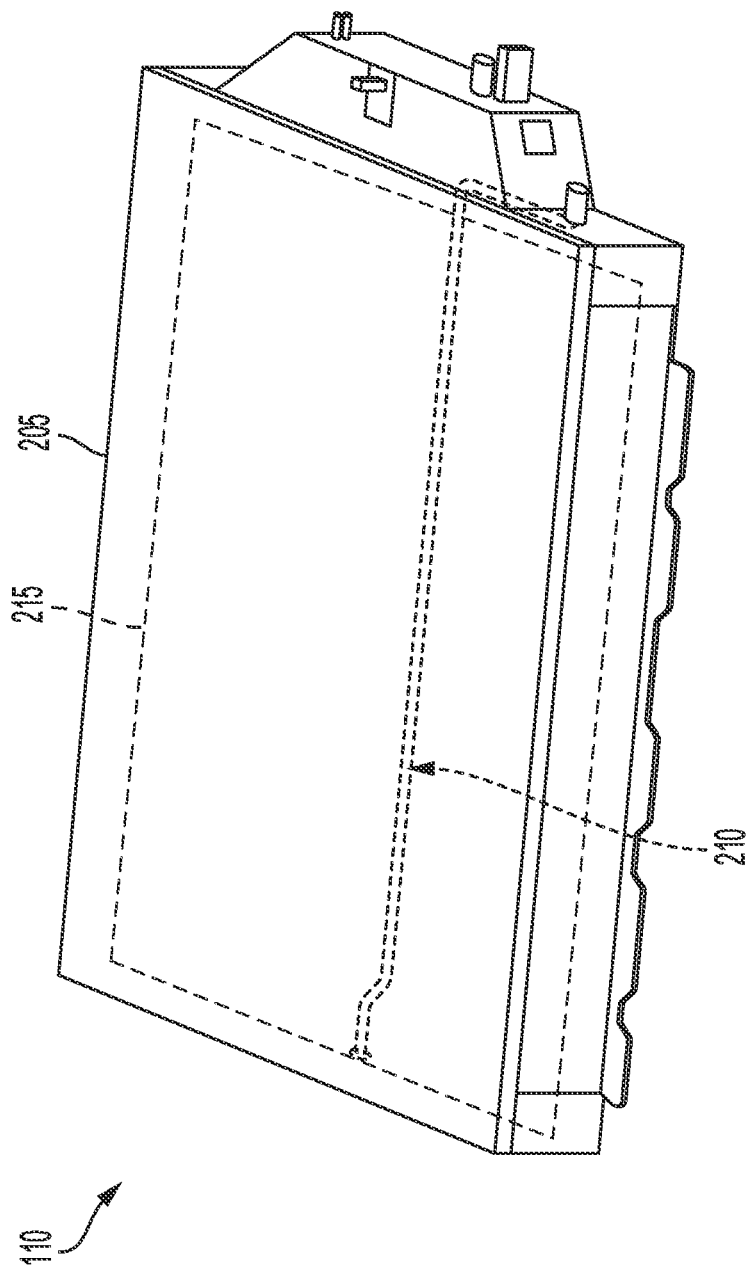
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
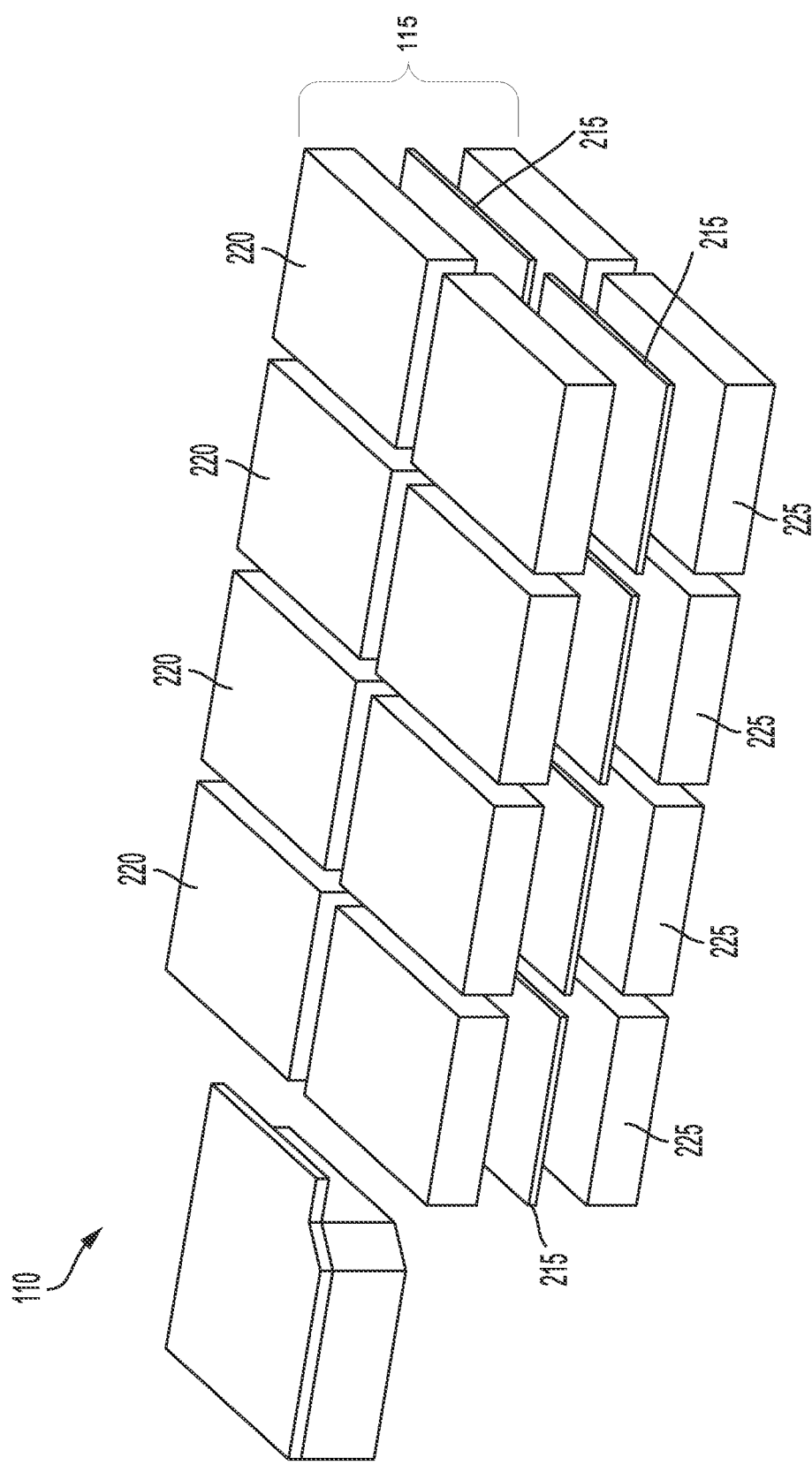
FIG. 2B depicts a battery module, according to an example implementation.
Figure 2C:
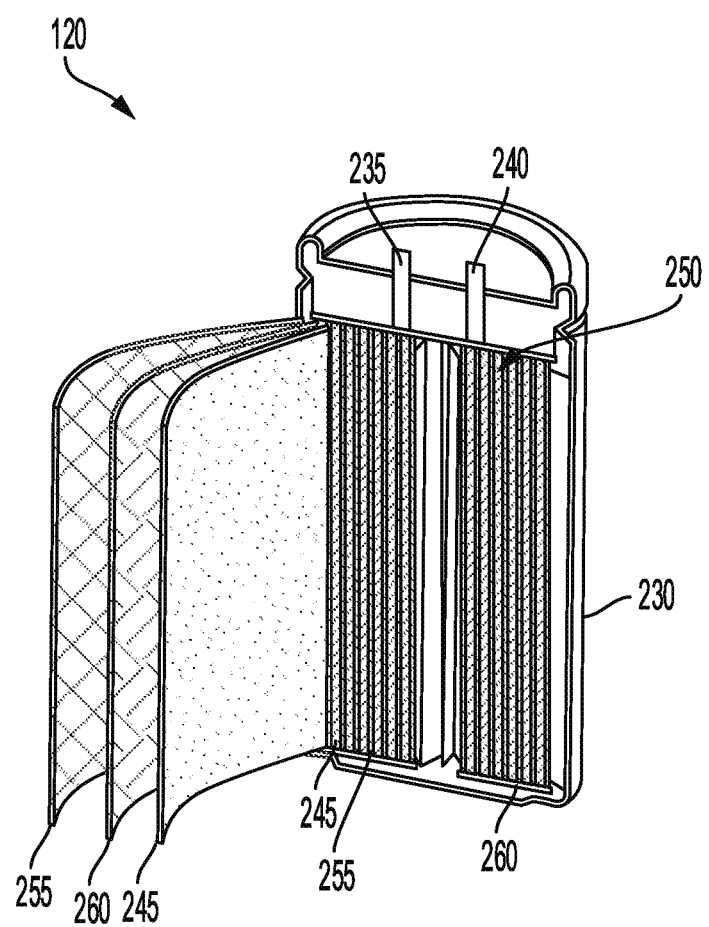
FIG. 2C depicts a cross-sectional view of a battery cell, according to an example implementation.
Figure 2D:
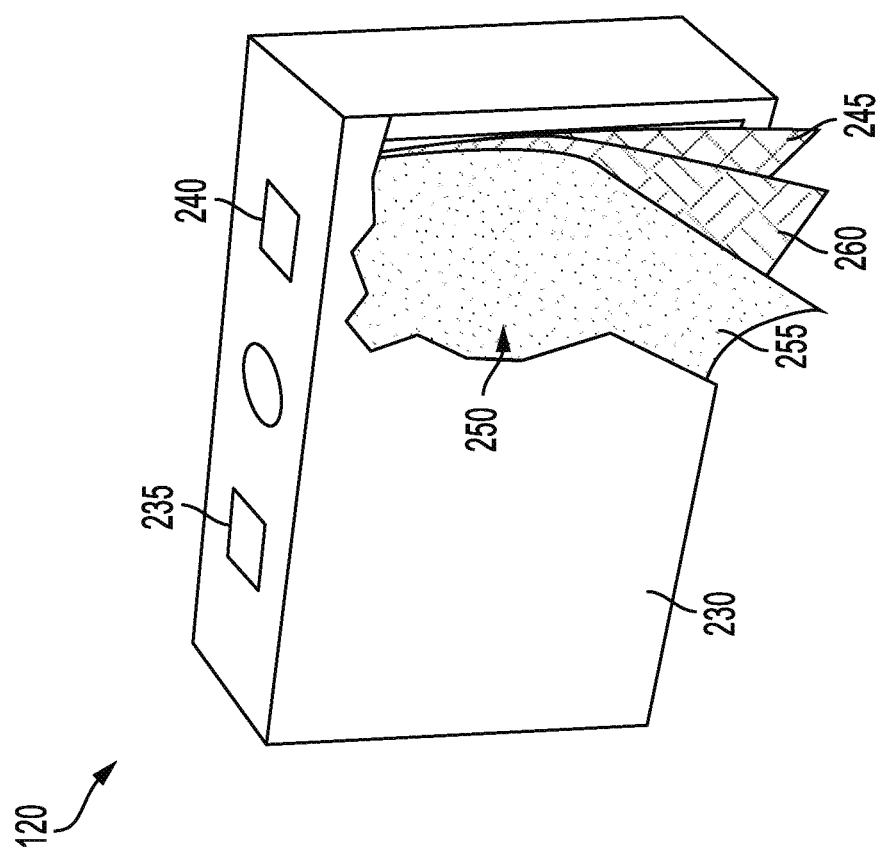
FIG. 2D depicts a cross sectional view of a battery cell, according to an example implementation.
Figure 2E:
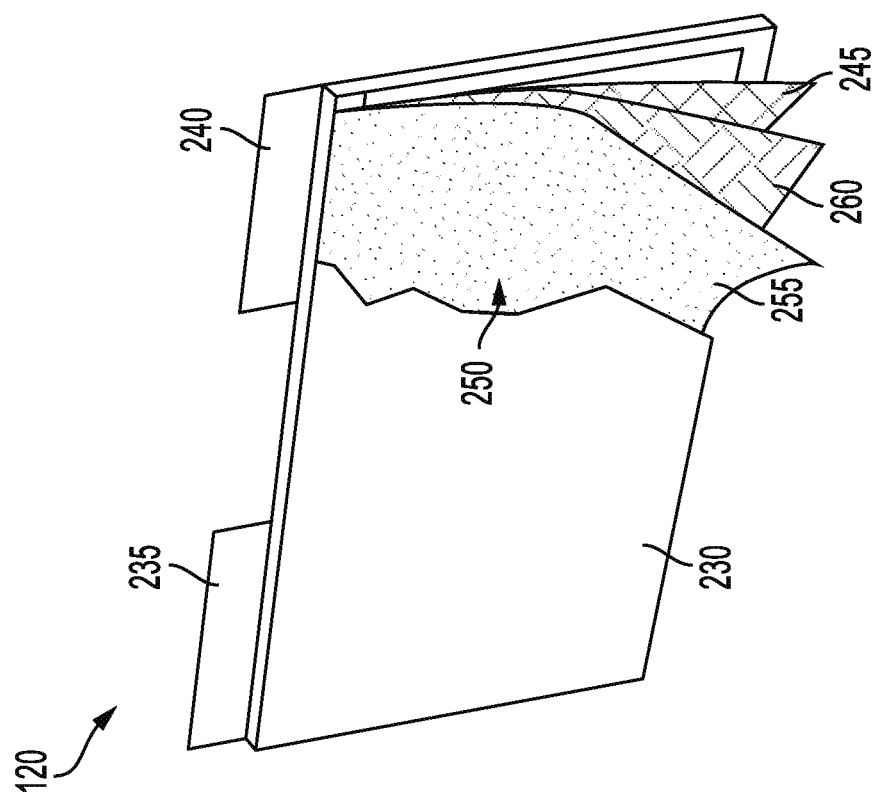
FIG. 2E depicts a cross sectional view of a battery cell, according to an example implementation.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a wound or stacked electrode roll (e.g., a jelly roll, an electrode stack and/or the like) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes.

Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4Ox$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). The lithium metal phosphate material may include $LiMn_xFe_{1-x}PO_4$, wherein x is 0.5-0.8. For example, x can be less than or equal to 0.8, 0.75, 0.7, 0.65, 0.6, or 0.55. In another example, x is greater than or equal to 0.5, 0.55, 0.6, 0.65, 0.7, or 0.75. Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Another cathode material that can be used for rechargeable lithium-ion batteries is over-lithiated oxide (OLO). Over-lithiated oxide materials can include materials that include more than one molar equivalent of lithium relative to the amount of transition metals in a crystal structure. Over-lithiated oxides can be charged above 4.4 V to access the extra lithium, where the $Li_2MnO_3$-like region in OLO can be activated by releasing oxygen gas. Over-lithiated oxide materials may be defined as $Li_{1+y}$ NMC materials (nickel manganese cobalt). Nickel, manganese, or cobalt may be doped or substituted by aluminum, which can help with redox chemistry, surface stabilization, suppressing gas evolution, etc. The OLO material may include $Li_{1+y}M_{1-y}O_2$, wherein y can be less than 0.3.

A further cathode material that can be used for rechargeable lithium-ion batteries include NMC materials. NMC materials can include ternary cathode materials that include nickel, manganese, and cobalt and generally include 33 wt % or greater nickel, and often 80 wt % or greater nickel.

Specifically, high nickel manganese cobalt oxide materials can be defined as including 80 wt % or more nickel. Different molar ratios between nickel, manganese, and cobalt can be synthesized, for example, NMC111, NMC523, NMC622, NMC811, etc. Aluminum can be substituted in the transition metal site for stabilization purposes. The high nickel NMC material can include at least 80% Ni, e.g., $LiNi_{0.8+z}(Co, Mn, Al)_{0.2-z}O_2$, where z is 0-0.2. For example, z may be less than or equal to 0.2, 0.19, 0.18, 0.17, 0.16, 0.15, 0.14, 0.13, 0.12, 0.11, 0.1, 0.09, 0.08, 0.07, 0.06, 0.05, 0.04, 0.03, 0.02, or 0.01. In another example, z may be greater than or equal to 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, or 0.19. When the nickel content becomes more than 88%, the NMC may be referred to as NCMA (where Al is a stabilizer).

Three active materials (e.g., lithium metal phosphate material, over-lithiated oxide material, and a high nickel manganese cobalt oxide material) may be combined to achieve an LMFP-rich region. The total amount of the LMFP material may be greater than or equal to 60 wt %, and the total amount of the OLO material and the NMC materials combined may be less than or equal to 40 wt %. The total amount of the LMFP material may be 60-98 wt %. The total amount of the LMFP material may be less than or equal to 98, 95, 90, 85, 80, 75, 70, or 65 wt %. The total amount of the LMFP material may be greater than or equal to 60, 65, 70, 75, 80, 85, 90, or 95 wt %. The total amount of the OLO material and the NMC materials combined may be 2-40 wt %. The total amount of the OLO material and the NMC materials combined may be less than or equal to 40, 35, 30, 25, 20, 15, 10, or 5 wt %. The total amount of the OLO material and the NMC materials combined may be greater than or equal to 2, 5, 10, 15, 20, 25, 30, or 35 wt %. The OLO material and the NMC material may be combined in equal amounts. The OLO material and the NMC material may be combined in unequal amounts.

The three active materials may be combined to achieve an OLO/NMC material-rich region. The total amount of the OLO and NMC materials combined may be greater than or equal to 80 wt %, and the total amount of the LMFP material may be less than or equal to 20 wt %. The total amount of the OLO and NMC materials combined may be 80-98 wt %. The total amount of the OLO and NMC materials combined may be less than or equal to 98, 95, 90, or 85 wt %. The total amount of the OLO and NMC materials combined may be greater than or equal to 80, 85, 90, or 95 wt %. The total amount of the LMFP material may be 2-20 wt %. The total amount of the LMFP material may be less than or equal to 20, 15, 10, or 5 wt %. The total amount of the LMFP material may be greater than or equal to 2, 5, 10, or 15 wt %. The OLO material and the NMC material may be combined in equal amounts. The OLO material and the NMC material may be combined in unequal amounts.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(m-ethyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the electrolyte layer 260 from greater than 0 M to about 1.5 M.

Figure 3:
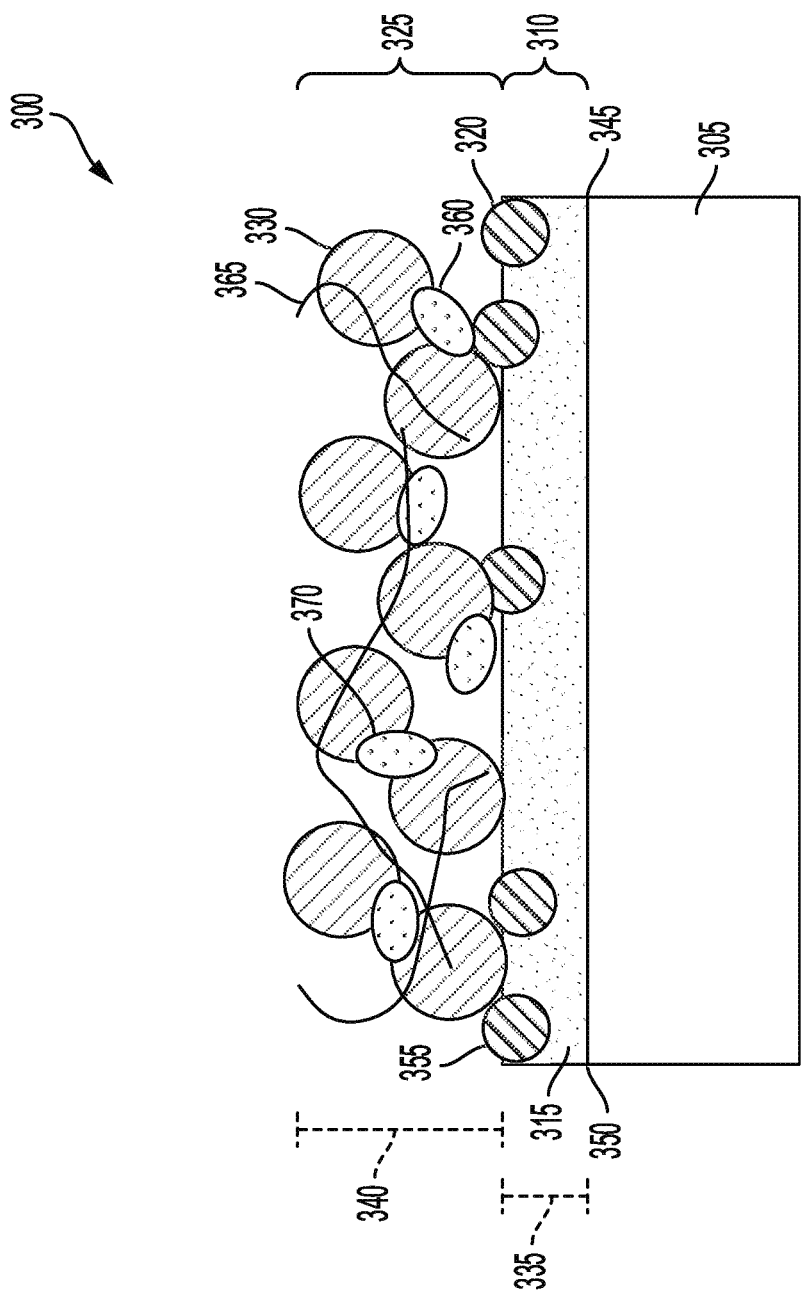
FIG. 3 depicts a perspective view of an electrode, according to an example implementation.

FIG. 3 depicts a perspective view of at least one electrode 300. The electrode 300 can include or be a cathode (e.g., cathode layer 255). The cathode can include an active substance (e.g., cathode active material). The electrode 300 can include or be an anode (e.g., anode layer 245). The anode can include an active substance (e.g., anode active material). The anode can include a current collector (e.g., copper current collector).

The electrode 300 can include at least one current collector 305 (e.g., current collector foil, metal foil, foil). The current collector 305 can include a metal or alloy. For example, the current collector 305 can be made of aluminum, copper, stainless steel, molybdenum, nickel, or carbonaceous materials, among others, or any combination thereof. The current collector 305 can include a conductive material. The anode layer 245 or anode can include the current collector 305. The cathode layer 255 or anode can include the current collector 305. The current collector 305 can be coated with an anode or a cathode active material. The current collector 305 can be coated with an anode or a cathode active material combined with conductive agent and binder material. For example, the current collector 305 can be coated with an anode electrode or a cathode electrode. The current collector 305 can be coated with the anode layer 245 or anode. The current collector 305 can be coated with the cathode layer 255 or cathode.

The electrode 300 can include at least one first layer 310. The first layer 310 can be on the current collector 305. For example, the first layer 310 can be disposed on the current collector 305. The first layer 310 can be on a first surface 345 of the current collector 305. The first layer 310 can be disposed on the first surface of the current collector 305. The first layer 310 can be coupled with the current collector 305. For example, the first layer 310 can be coupled with the first surface 345 of the current collector 305. The first surface 345 of the current collector 305 can be coupled with a first surface 350 of the first layer 310. The first layer 310 can include a coating disposed on the current collector 305. The first layer 310 can include a base layer. The base layer can be disposed on the current collector 305. The first layer 310 can include an adhesion layer. The adhesion layer can be disposed on the current collector 305. The first layer 310 can adhere to the current collector 305.

The first layer 310 can include at least one electrically conductive material 315 (e.g., conductive material, conductive agent, electrically conductive agent). The electrically conductive material 315 can include carbon. The electrically conductive material 315 can include an amorphous material. For example, the electrically conductive material 315 can include an amorphous $sp^3$-type carbon conductive material. The electrically conductive material 315 can include a graphitic $sp^2$-type carbon. For example, the electrically conductive material 315 can include a single-walled carbon nanotube (SWCNT) or a multi-walled carbon nanotube (MWCNT). The electrically conductive material 315 can include a conductive polymer. The electrically conductive material 315 can include graphite, carbon black, carbon nanotubes, Super P carbon black material, Ketjen Black, Acetylene Black, SWCNT, MWCNT, carbon nanofiber, graphene, and combinations thereof.

The first layer 310 can include at least one first electrode active material 320. The first electrode active material 320 can include a cathode active material (e.g., first cathode active material). The first electrode active material 320 can include an anode active material (e.g., first anode active material). The first electrode active material 320 can include lithium manganese iron phosphate, lithium iron phosphate, or a combination thereof. The first layer 310 can include an amount of the first electrode active material 320.

The first layer 310 can include less than 5 wt % of the first electrode active material 320. For example, the first layer 310 can include less than 4.5 wt % of the first electrode active material 320, less than 4 wt % of the first electrode active material 320, less than 3.5 wt % of the first electrode active material 320, less than 3 wt % of the first electrode active material 320, less than 2.5 wt % of the first electrode active material 320, less than 2 wt % of the first electrode active material 320, less than 1.5 wt % of the first electrode active material 320, less than 1 wt % of the first electrode active material 320, or less than 0.5 wt % of the first electrode active material 320.

The first layer 310 can include the first electrode active material 320 in a range of 0.5 wt % to 5 wt %. For example, the first layer can include the first electrode active material 320 in a range of 0.5 wt % to 1 wt %, 0.5 wt % to 1.5 wt %, 0.5 wt % to 2 wt %, 0.5 wt % to 2.5 wt %, 0.5 wt % to 3 wt %, 0.5 wt % to 3.5 wt %, 0.5 wt % to 4 wt %, 0.5 wt % to 4.5 wt %, 0.5 wt % to 5 wt %, 1 wt % to 1.5 wt %, 1 wt % to 2 wt %, 1 wt % to 2.5 wt %, 1 wt % to 3 wt %, 1 wt % to 3.5 wt %, 1 wt % to 4 wt %, 1 wt % to 4.5 wt %, 1 wt % to 5 wt %, 1.5 wt % to 2 wt %, 1.5 wt % to 2.5 wt %, 1.5 wt % to 3 wt %, 1.5 wt % to 3.5 wt %, 1.5 wt % to 4 wt %, 1.5 wt % to 4.5 wt %, 1.5 wt % to 5 wt %, 2 wt % to 2.5 wt %, 2 wt % to 3 wt %, 2 wt % to 3.5 wt %, 2 wt % to 4 wt %, 2 wt % to 4.5 wt %, 2 wt % to 5 wt %, 2.5 wt % to 3 wt %, 2.5 wt % to 3.5 wt %, 2.5 wt % to 4 wt %, 2.5 wt % to 4.5 wt %, 2.5 wt % to 5 wt %, 3 wt % to 3.5 wt %, 3 wt % to 4 wt %, 3 wt % to 4.5 wt %, 3 wt % to 5 wt %, 3.5 wt % to 4 wt %, 3.5 wt % to 4.5 wt %, 3.5 wt % to 5 wt %, 4 wt % to 4.5 wt %, 4 wt % to 5 wt %, or 4.5 wt % to 5 wt %.

The first electrode active material 320 can have a D50 (e.g., median diameter, medium value of particle size distribution) of less than 2 μm. D50 can refer to the median particle size measured from the particle size analyzer (PSA), or the particle size (diameter) at 50% in a cumulative distribution. For example, the first electrode active material 320 can have a D50 of less than 1.9 μm, less than 1.8 μm, less than 1.7 μm, less than 1.6 μm, less than 1.5 μm, less than 1.4 μm, less than 1.3 μm, less than 1.2 μm, less than 1.1 μm, less than 1 μm, less than 0.9 μm, less than 0.8 μm, less than 0.7 μm, less than 0.6 μm, less than 0.5 μm, less than 0.4 μm, less than 0.3 μm, less than 0.2 μm, or less than 0.1 μm.

The first electrode active material 320 can have a D50 in a range of 0.1 μm to 2 μm. For example, the first electrode active material 320 can have a D50 in a range of 0.1 μm to 0.2 μm, 0.1 μm to 0.3 μm, 0.1 μm to 0.4 μm, 0.1 μm to 0.5 μm, 0.1 μm to 0.6 μm, 0.1 μm to 0.7 μm, 0.1 μm to 0.8 μm, 0.1 μm to 0.9 μm, 0.1 μm to 1 μm, 0.1 μm to 1.1 μm, 0.1 μm to 1.2 μm, 0.1 μm to 1.3 μm, 0.1 μm to 1.4 μm, 0.1 μm to 1.5 μm, 0.1 μm to 1.6 μm, 0.1 μm to 1.7 μm, 0.1 μm to 1.8 μm, 0.1 μm to 1.9 μm, 0.1 μm to 2 μm, 0.2 μm to 0.3 μm, 0.2 μm to 0.4 μm, 0.2 μm to 0.5 μm, 0.2 μm to 0.6 μm, 0.2

μm to 0.7 μm, 0.2 μm to 0.8 μm, 0.2 μm to 0.9 μm, 0.2 μm to 1 μm, 0.2 μm to 1.1 μm, 0.2 μm to 1.2 μm, 0.2 μm to 1.3 μm, 0.2 μm to 1.4 μm, 0.2 μm to 1.5 μm, 0.2 μm to 1.6 μm, 0.2 μm to 1.7 μm, 0.2 μm to 1.8 μm, 0.2 μm to 1.9 μm, 0.2 μm to 2 μm, 0.3 μm to 0.4 μm, 0.3 μm to 0.5 μm, 0.3 μm to 0.6 μm, 0.3 μm to 0.7 μm, 0.3 μm to 0.8 μm, 0.3 μm to 0.9 μm, 0.3 μm to 1 μm, 0.3 μm to 1.1 μm, 0.3 μm to 1.2 μm, 0.3 μm to 1.3 μm, 0.3 μm to 1.4 μm, 0.3 μm to 1.5 μm, 0.3 μm to 1.6 μm, 0.3 μm to 1.7 μm, 0.3 μm to 1.8 μm, 0.3 μm to 1.9 μm, or 0.3 μm to 2 μm.

The first electrode active material 320 can have a D50 in a range of 0.4 μm to 0.5 μm, 0.4 μm to 0.6 μm, 0.4 μm to 0.7 μm, 0.4 μm to 0.8 μm, 0.4 μm to 0.9 μm, 0.4 μm to 1 μm, 0.4 μm to 1.1 μm, 0.4 μm to 1.2 μm, 0.4 μm to 1.3 μm, 0.4 μm to 1.4 μm, 0.4 μm to 1.5 μm, 0.4 μm to 1.6 μm, 0.4 μm to 1.7 μm, 0.4 μm to 1.8 μm, 0.4 μm to 1.9 μm, 0.4 μm to 2 μm, 0.5 μm to 0.6 μm, 0.5 μm to 0.7 μm, 0.5 μm to 0.8 μm, 0.5 μm to 0.9 μm, 0.5 μm to 1 μm, 0.5 μm to 1.1 μm, 0.5 μm to 1.2 μm, 0.5 μm to 1.3 μm, 0.5 μm to 1.4 μm, 0.5 μm to 1.5 μm, 0.5 μm to 1.6 μm, 0.5 μm to 1.7 μm, 0.5 μm to 1.8 μm, 0.5 μm to 1.9 μm, 0.5 μm to 2 μm, 0.6 μm to 0.7 μm, 0.6 μm to 0.8 μm, 0.6 μm to 0.9 μm, 0.6 μm to 1 μm, 0.6 μm to 1.1 μm, 0.6 μm to 1.2 μm, 0.6 μm to 1.3 μm, 0.6 μm to 1.4 μm, 0.6 μm to 1.5 μm, 0.6 μm to 1.6 μm, 0.6 μm to 1.7 μm, 0.6 μm to 1.8 μm, 0.6 μm to 1.9 μm, 0.6 μm to 2 μm, 0.7 μm to 0.8 μm, 0.7 μm to 0.9 μm, 0.7 μm to 1 μm, 0.7 μm to 1.1 μm, 0.7 μm to 1.2 μm, 0.7 μm to 1.3 μm, 0.7 μm to 1.4 μm, 0.7 μm to 1.5 μm, 0.7 μm to 1.6 μm, 0.7 μm to 1.7 μm, 0.7 μm to 1.8 μm, 0.7 μm to 1.9 μm, 0.7 μm to 2 μm, 0.8 μm to 0.9 μm, 0.8 μm to 1 μm, 0.8 μm to 1.1 μm, 0.8 μm to 1.2 μm, 0.8 μm to 1.3 μm, 0.8 μm to 1.4 μm, 0.8 μm to 1.5 μm, 0.8 μm to 1.6 μm, 0.8 μm to 1.7 μm, 0.8 μm to 1.8 μm, 0.8 μm to 1.9 μm, or 0.8 μm to 2 μm.

The first electrode active material 320 can have a D50 in a range of 0.9 μm to 1 μm, 0.9 μm to 1.1 μm, 0.9 μm to 1.2 μm, 0.9 μm to 1.3 μm, 0.9 μm to 1.4 μm, 0.9 μm to 1.5 μm, 0.9 μm to 1.6 μm, 0.9 μm to 1.7 m, 0.9 μm to 1.8 μm, 0.9 μm to 1.9 μm, 0.9 μm to 2 μm, 1 μm to 1.1 μm, 1 μm to 1.2 μm, 1 μm to 1.3 μm, 1 μm to 1.4 μm, 1 μm to 1.5 μm, 1 μm to 1.6 μm, 1 μm to 1.7 μm, 1 μm to 1.8 μm, 1 μm to 1.9 μm, 1 μm to 2 μm, 1.1 μm to 1.2 μm, 1.1 μm to 1.3 μm, 1.1 μm to 1.4 μm, 1.1 μm to 1.5 μm, 1.1 μm to 1.6 μm, 1.1 μm to 1.7 m, 1.1 μm to 1.8 μm, 1.1 μm to 1.9 μm, 1.1 μm to 2 μm, 1.2 μm to 1.3 μm, 1.2 μm to 1.4 μm, 1.2 μm to 1.5 μm, 1.2 μm to 1.6 μm, 1.2 μm to 1.7 μm, 1.2 μm to 1.8 μm, 1.2 μm to 1.9 μm, 1.2 μm to 2 μm, 1.3 μm to 1.4 μm, 1.3 μm to 1.5 μm, 1.3 μm to 1.6 μm, 1.3 μm to 1.7 m, 1.3 μm to 1.8 μm, 1.3 μm to 1.9 μm, 1.3 μm to 2 μm, 1.4 μm to 1.5 μm, 1.4 μm to 1.6 μm, 1.4 μm to 1.7 μm, 1.4 μm to 1.8 μm, 1.4 μm to 1.9 μm, 1.4 μm to 2 μm, 1.5 μm to 1.6 μm, 1.5 μm to 1.7 μm, 1.5 μm to 1.8 μm, 1.5 μm to 1.9 μm, 1.5 μm to 2 μm, 1.6 μm to 1.7 μm, 1.6 μm to 1.8 μm, 1.6 μm to 1.9 μm, 1.6 μm to 2 μm, 1.7 μm to 1.8 μm, 1.7 μm to 1.9 μm, 1.7 μm to 2 μm, 1.8 μm to 1.9 μm, 1.8 μm to 2 μm, or 1.9 μm to 2 μm.

The first layer 310 can have a thickness 335 (e.g., first thickness). The thickness 335 can be less than 10 μm. For example, the thickness 335 can be less than 9 μm, less than 8 μm, less than 7 μm, less than 6 μm, less than 5 μm, less than 4 μm, less than 3 μm, less than 2 μm, or less than 1 μm. The thickness 335 can be in a range of 0.1 μm to 9 μm. For example, the thickness 335 can be in a range of 0.1 μm to 0.5 μm, 0.1 μm to 1 μm, 0.1 μm to 2 μm, 0.1 μm to 3 μm, 0.1 μm to 4 μm, 0.1 μm to 5 μm, 0.1 μm to 6 μm, 0.1 μm to 7 μm, 0.1 μm to 8 μm, 0.1 μm to 9 μm, 0.5 μm to 1 μm, 0.5 μm to 2 μm, 0.5 μm to 3 μm, 0.5 μm to 4 μm, 0.5 μm to 5 μm, 0.5 μm to 6 μm, 0.5 μm to 7 μm, 0.5 μm to 8 μm, 0.5 μm to 9 μm, 1 μm to 2 μm, 1 μm to 3 μm, 1 μm to 4 μm, 1 μm to 5 μm, 1 μm to 6 μm, 1 μm to 7 μm, 1 μm to 8 μm, 1 μm to 9 μm, 2 μm to 3 μm, 2 μm to 4 μm, 2 μm to 5 μm, 2 μm to 6 μm, 2 μm to 7 μm, 2 μm to 8 μm, 2 μm to 9 μm, 3 μm to 4 μm, 3 μm to 5 μm, 3 μm to 6 μm, 3 μm to 7 μm, 3 μm to 8 μm, 3 μm to 9 μm, 4 μm to 5 μm, 4 μm to 6 μm, 4 μm to 7 μm, 4 μm to 8 μm, 4 μm to 9 μm, 5 μm to 6 μm, 5 μm to 7 μm, 5 μm to 8 μm, 5 μm to 9 μm, 6 μm to 7 μm, 6 μm to 8 μm, 6 μm to 9 μm, 7 μm to 8 μm, 7 μm to 9 μm, or 8 μm to 9 μm.

The electrode 300 can include at least one second layer 325. The first layer 310 and the second layer 325 can form a tandem (e.g., dual) coating. The second layer 325 can adhere to the current collector 305 through the first layer 310. The first layer 310 can allow the second layer 325 to adhere to the current collector 305. The second layer 325 can be on the first layer 310. For example, the second layer 325 can be disposed on the first layer 310. The second layer 325 can be coupled with the first layer 310. For example, the second layer 325 can be coupled with a second surface 355 of the first layer 310. The first surface 350 of the first layer 310 can be different from the second surface 355 of the first layer 310. The first surface 350 of the first layer 310 and the second surface 355 of the first layer 310 can be located on opposite sides of the first layer 310. The distance between the first surface 350 of the first layer 310 and the current collector 305 can be less than the distance between the second surface 355 of the first layer 310 and the current collector 305. The distance between the second surface 355 of the first layer 310 and the current collector 305 can be greater than the distance between the first surface 350 of the first layer 310 and the current collector 305. The second layer 325 can include an active material layer.

The second layer 325 can include at least one second electrode active material 330. The second electrode active material 330 can include a cathode active material (e.g., second cathode active material). The second electrode active material 330 can include an anode active material (e.g., second anode active material). The second electrode active material 330 can include lithium manganese iron phosphate, lithium iron phosphate, or a combination thereof. The second electrode active material 330 can be the same as or different from the first electrode active material 320. For example, the second electrode active material 330 in the second layer 325 can be the same as or different from the first electrode active material 320 in the first layer 310.

The second electrode active material 330 (e.g., cathode active material) can have a surface area of less than or equal to 25 $m^2/g$. For example, the second electrode active material 330 can have a surface area of less than or equal to 25 $m^2/g$, less than or equal to 20 $m^2/g$, less than or equal to 15 $m^2/g$, less than or equal to 10 $m^2/g$, or less than or equal to 5 $m^2/g$. The second electrode active material 330 can have a surface area in a range of 5 $m^2/g$ to 10 $m^2/g$, 5 $m^2/g$ to 15 $m^2/g$, 5 $m^2/g$ to 20 $m^2/g$, 5 $m^2/g$ to 25 $m^2/g$, 10 $m^2/g$ to 15 $m^2/g$, 10 $m^2/g$ to 20 $m^2/g$, 10 $m^2/g$ to 25 $m^2/g$, 15 $m^2/g$ to 20 $m^2/g$, 15 $m^2/g$ to 25 $m^2/g$, or 20 $m^2/g$ to 25 $m^2/g$.

The second layer 325 can include an amount of the second electrode active material 330. The amount of the second electrode active material 330 in the second layer 325 can be greater than the amount of the first electrode active material 320 in the first layer 310. The amount of the first electrode active material 320 in the first layer 310 can be less than the amount of the second electrode active material 330 in the second layer 325.

The second layer 325 can include at least 94 wt % of the second electrode active material 330. For example, the second layer 325 can include at least 94.5 wt % of the second electrode active material 330, at least 95 wt % of the second electrode active material 330, at least 95.5 wt % of the second electrode active material 330, at least 96 wt % of the second electrode active material 330, at least 96.5 wt % of the second electrode active material 330, at least 97 wt % of the second electrode active material 330, at least 97.5 wt % of the second electrode active material 330, or at least 98 wt % of the second electrode active material 330.

The distance between the second electrode active material 330 and the second surface 355 of the first layer 310 can be less than the distance between the second electrode active material 330 and the first surface 350 of the first layer 310. The distance between the second electrode active material 330 and the first surface 350 of the first layer 310 can be greater than the distance between the second electrode active material 330 and the second surface 355 of the first layer 310. The second electrode active material 330 can include a first surface 360. The first surface 360 of the second electrode active material 330 can be coupled with the first layer 310. For example, the first surface 360 of the second electrode active material 330 can be coupled with the second surface 355 of the first layer 310. The distance between the first surface 360 of the second electrode active material 330 and the second surface 355 of the first layer 310 can be less than the distance between the first surface 360 of the second electrode active material 330 and the first surface 350 of the first layer 310. The distance between the first surface 360 of the second electrode active material 330 and the first surface 350 of the first layer 310 can be greater than the distance between the first surface 360 of the second electrode active material 330 and the second surface 355 of the first layer 310.

An interfacial resistance between the cathode active material and the current collector 305 can be decreased. For example, the interfacial resistance between the cathode active material and the current collector 305 can be decreased compared to an electrode without the first electrode active material 320 in the first layer 310. The first electrode active material 320 can reduce the interfacial resistance between the cathode active material and the current collector 305. The first electrode active material 320 can reduce the interfacial resistance between the second electrode active material 330 and the current collector 305. A phase transformation can occur during the lithium ion intercalation or deintercalation process while the battery charges or discharges. The phase transformation can lead to a volume change at or near the interface between the current collector 305 and the electrode 300 or the current collector 305 and the second electrode active material 330. In some examples, if no active material is present in the first layer 310, the first layer 310 contributes to the electron transfer from the conductive layer. Having a small amount of electrode active material 320 in the first layer 310 can result in Li$^+$ ion diffusion (e.g., increased ionic conductivity) that makes the first layer 320 become active (e.g., chemically active). The first layer 310 can neighbor the electrically conductive material 315.

The second electrode active material 330 can have a D50 of less than or equal to 20 µm. For example, the second electrode active material 330 can have a D50 of less than or equal to 20 µm, less than or equal to 19 µm, less than or equal to 18 µm, less than or equal to 17 µm, less than or equal to 16 µm, less than or equal to 15 µm, less than or equal to 14 µm, less than or equal to 13 µm, less than or equal to 12 µm, less than or equal to 11 µm, less than or equal to 1 µm, less than or equal to 0.9 µm, less than or equal to 0.8 µm, less than or equal to 0.7 µm, less than or equal to 0.6 µm, less than or equal to 0.5 µm, less than or equal to 0.4 µm, less than or equal to 0.3 µm, less than or equal to 0.2 µm, or less than or equal to 0.1 µm. The D50 of the second electrode active material 330 can be greater than the D50 of the first electrode active material 320. The D50 of the first electrode active material 320 can be less than the D50 of the second electrode active material 330.

The second layer 325 can have a thickness 340 (e.g., second thickness). The thickness 340 can be less than 300 µm. For example, the thickness 340 can be less than 275 µm, less than 250 µm, less than 225 µm, less than 200 µm, less than 175 µm, less than 150 µm, less than 125 µm, less than 100 µm, less than 75 µm, less than 50 µm, or less than 25 µm. The thickness 340 can be in a range of 25 µm to 275 µm. For example, the thickness 340 can be in a range of 25 µm to 50 µm, 25 µm to 75 µm, 25 µm to 100 µm, 25 µm to 125 µm, 25 µm to 150 µm, 25 µm to 175 µm, 25 µm to 200 µm, 25 µm to 225 µm, 25 µm to 250 µm, 25 µm to 275 µm, 50 µm to 75 µm, 50 µm to 100 µm, 50 µm to 125 µm, 50 µm to 150 µm, 50 µm to 175 µm, 50 µm to 200 µm, 50 µm to 225 µm, 50 µm to 250 µm, 50 µm to 275 µm, 75 µm to 100 µm, 75 µm to 125 µm, 75 µm to 150 µm, 75 µm to 175 µm, 75 µm to 200 µm, 75 µm to 225 µm, 75 µm to 250 µm, 75 µm to 275 µm, 100 µm to 125 µm, 100 µm to 150 µm, 100 µm to 175 µm, 100 µm to 200 µm, 100 µm to 225 µm, 100 µm to 250 µm, 100 µm to 275 µm, 125 µm to 150 µm, 125 µm to 175 µm, 125 µm to 200 µm, 125 µm to 225 µm, 125 µm to 250 µm, 125 µm to 275 µm, 150 µm to 175 µm, 150 µm to 200 µm, 150 µm to 225 µm, 150 µm to 250 µm, 150 µm to 275 µm, 175 µm to 200 µm, 175 µm to 225 µm, 175 µm to 250 µm, 175 µm to 275 µm, 200 µm to 225 µm, 200 µm to 250 µm, 200 µm to 275 µm, 225 µm to 250 µm, 225 µm to 275 µm, or 250 µm to 275 µm.

The first thickness can be less than the second thickness. For example, the thickness 335 can be less than the thickness 340. The first thickness can be greater than the second thickness. For example, the thickness 335 can be greater than the thickness 340. The second thickness can be less than the first thickness. For example, the thickness 340 can be less than the thickness 335. The second thickness can be greater than the first thickness. For example, the thickness 340 can be greater than the thickness 335. The ratio of the second thickness to the first thickness can be less than or equal to 3000. For example, the ratio of the second thickness to the first thickness can be less than or equal to 3000, less than or equal to 2500, less than or equal to 2000, less than or equal to 1500, less than or equal to 1000, less than or equal to 500, less than or equal to 400, less than or equal to 300, less than or equal to 200, less than or equal to 100, less than or equal to 50, or less than or equal to 10.

The second layer 325 can include at least one binder 365. The binder 365 can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

The second layer 325 can include a carbon conductive agent 370. The second layer 325 can include the carbon conductive agent 370 in a range of 1 wt % to 4 wt %. For example, the second layer 325 can include the carbon conductive agent in a range of 1 wt % to 1.5 wt %, 1 wt % to 2 wt %, 1 wt % to 2.5 wt %, 1 wt % to 3 wt %, 1 wt % to 3.5 wt %, 1 wt % to 4 wt %, 1.5 wt % to 2 wt %, 1.5 wt % to 2.5 wt %, 1.5 wt % to 3 wt %, 1.5 wt % to 3.5 wt %, 1.5 wt % to 4 wt %, 2 wt % to 2.5 wt %, 2 wt % to 3 wt %, 2 wt % to 3.5 wt %, 2 wt % to 4 wt %, 2.5 wt % to 3 wt %, 2.5 wt % to 3.5 wt %, 2.5 wt % to 4 wt %, 3 wt % to 3.5 wt %, 3 wt % to 4 wt %, or 3.5 wt % to 4 wt %.

Table 1, below, shows ranges of D50, carbon content, surface area, and powder compaction for the second electrode active material 330. The second electrode active material 330 can include $LiFePO_4$, $LiFe_xMn_{(1-x)}PO_4$ ($0 \leq x \leq 1$), or $LiMnPO_4$.

| Specifications | Unit | $LiFePO_4$ | $LiFe_xMn_{(1-x)}PO_4$ | $LiMnPO_4$ |
|---|---|---|---|---|
| PSD (D50) | μm | 0.5-15 | 0.5-15 | 0.5-15 |
| Carbon content | % | 1.0-2.5 | 1.5-3.0 | 2.0-3.5 |
| Surface area | m²/g | 7-20 | 12-28 | 17-32 |
| Powder compaction | g/cm³ | 2.2-2.8 | 2.0-2.6 | 1.8-2.4 |

Figure 4:
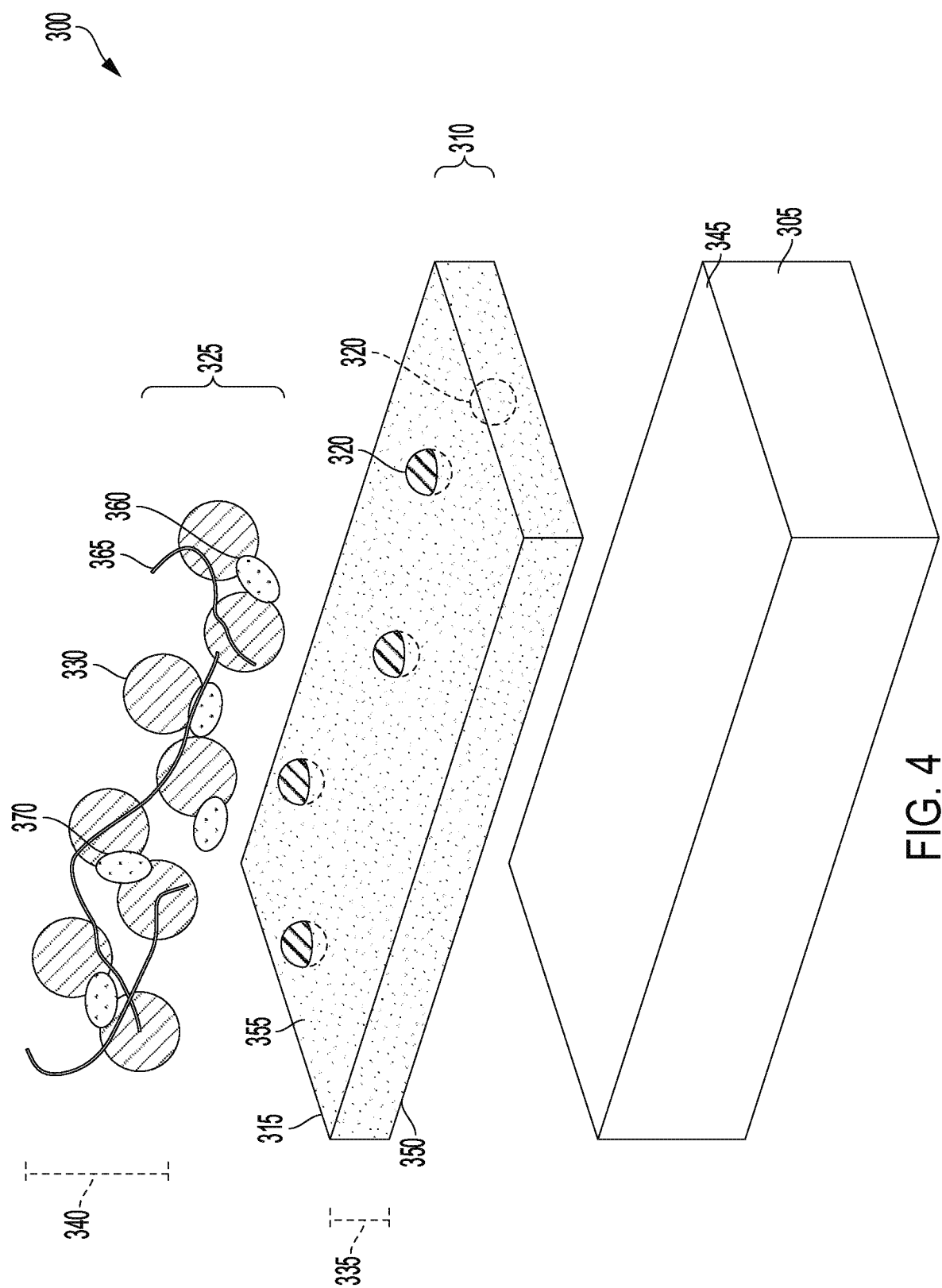
FIG. 4 depicts an exploded view of an electrode, according to an example implementation.

FIG. 4 depicts an exploded view of the electrode 300. The electrode 300 can include the current collector 305. The current collector 305 can include the first surface 345 of the current collector 305. The electrode 300 can include the first layer 310. The first layer 310 can include the first surface 350 of the first layer 310. The first layer 310 can include the second surface 355 of the first layer 310. The first layer 310 can include the electrically conductive material 315. The first layer 310 can include the first electrode active material 320. The first layer 310 can have the thickness 335 of the first layer 310. The electrode 300 can include the second layer 325. The second layer 325 can include the second electrode active material 330. The second electrode active material 330 can include the first surface 360 of the second electrode active material 330. The second layer 325 can include the binder 365. The second layer 325 can include the carbon conductive agent 370. The second layer 325 can have the thickness 340 of the second layer 325.

Figure 5:
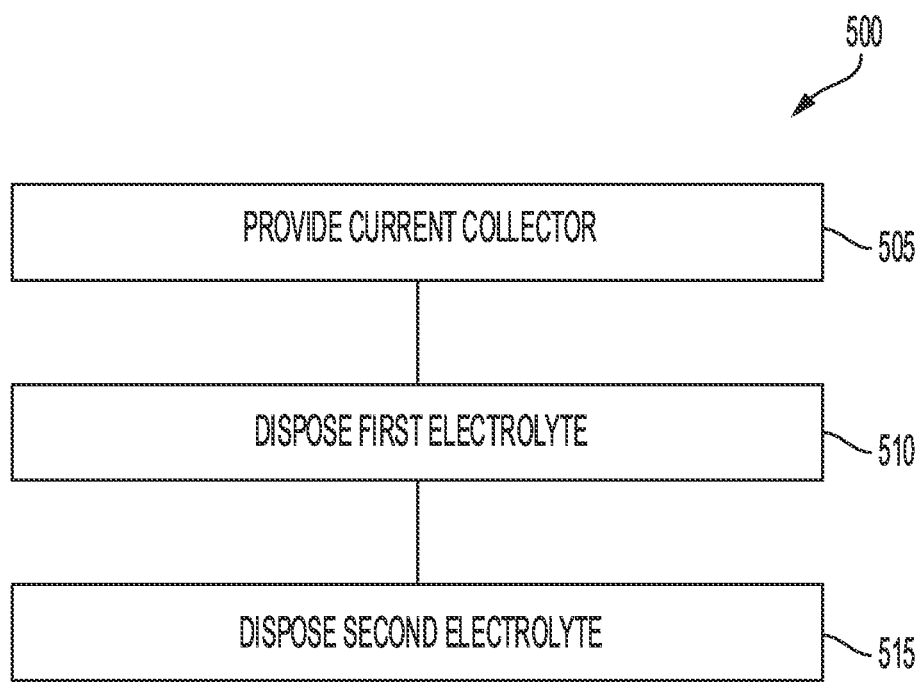
FIG. 5 depicts a method of improving adhesion of electrodes, according to an example implementation.

FIG. 5 depicts a method of improving adhesion of electrodes. The method 500 can include providing the current collector 305 (ACT 505). The method 500 can include disposing the first layer 310 (ACT 510). The method 500 can include disposing the second layer 325 (ACT 515).

The method 500 can include providing the current collector 305 (ACT 505). The current collector 305 can include a current collector foil, metal foil, or foil. The current collector 305 can include a metal or alloy. For example, the current collector 305 can be made of aluminum, copper, stainless steel, molybdenum, nickel, or carbonaceous materials, among others, or any combination thereof. The current collector 305 can include a conductive material.

The method 500 can include disposing the first layer 310 (ACT 510). For example, the method 500 can include disposing the first layer 310 on the first surface 345 of the current collector 305. The method 500 can include coupling the first layer 310 to the first surface 345 of the current collector 305. The first layer 310 can have the thickness 335 of less than 10 μm. The first layer 310 can include the electrically conductive material 315. The first layer 310 can include the first electrode active material 320. The first electrode active material 320 can include lithium manganese iron phosphate, lithium iron phosphate, or a combination thereof. The first electrode active material 320 can have a D50 of less than 2 μm.

The method 500 can include disposing the second layer 325 (ACT 515). For example, the method 500 can include disposing the second layer 325 on the first layer 310. The second layer 325 can include the second electrode active material 330. The second electrode active material 330 can include the cathode active material. The amount of the second electrode active material 330 in the second layer 325 can be greater than the amount of the first electrode active material 320 in the first layer 310. The amount of the first electrode active material 320 in the first layer 310 can be less than the amount of the second electrode active material 330 in the second layer 325.

Figure 6:
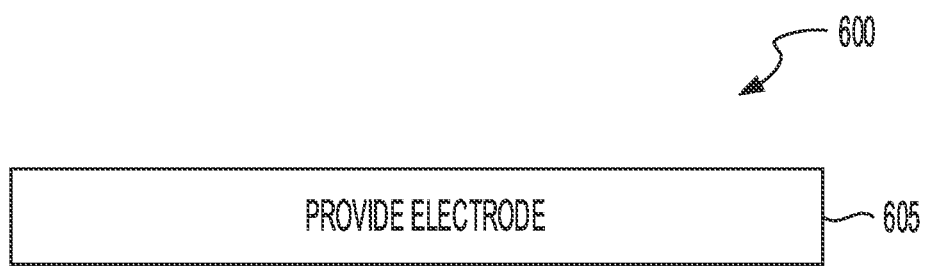
FIG. 6 depicts a method of providing an electrode, according to an example implementation.

FIG. 6 depicts a method 600 of providing the electrode 300. The method 600 can include providing the electrode 300 (ACT 605). For example, the method 600 can include providing (ACT 605) the battery cell 120 including the electrode 300. The electrode 300 can include the current collector 305. The electrode can include the first layer 310 on the first surface 345 of the current collector 305. The first layer 310 can include the first electrode active material 320 and the electrically conductive material 315. The electrode 300 can include the second layer 325 on the first layer 310. The second layer 325 can include the second electrode active material 330. The amount of the second electrode active material 330 in the second layer 325 can be greater than the amount of the first electrode active material 320 in the first layer 310.

At least one aspect is directed to the electric vehicle 105. The electric vehicle 105 can include the battery cell 120. The battery cell 120 can include the anode. The battery cell 120 can include the cathode. The cathode can include the current collector 305. The cathode can include the first layer 310 on the first surface 345 of the current collector 305. The first layer 310 can include the first cathode active material and the electrically conductive material 315. The cathode can include the second layer 325 on the first layer 310. The second layer 325 can include the second cathode active material. An amount of the second cathode active material in the second layer 325 can be greater than an amount of the first cathode active material in the first layer 310.

At least one aspect is directed to a battery. The battery can include the anode. The battery can include the cathode. The cathode can include the current collector 305. The cathode can include the first layer 310 on the first surface 345 of the current collector 305. The first layer 310 can include the first cathode active material and the electrically conductive material 315. The cathode can include the second layer 325 on the first layer 310. The second layer 325 can include the second cathode active material. An amount of the second cathode active material in the second layer 325 can be greater than an amount of the first cathode active material in the first layer 310.

At least one aspect is directed to a system. The system can include the battery cell 120. The battery cell 120 can include the anode. The battery cell 120 can include the cathode. The cathode can include the current collector 305. The cathode can include the first layer 310 on the first surface 345 of the current collector 305. The first layer 310 can include the first cathode active material and the electrically conductive material 315. The cathode can include the second layer 325 on the first layer 310. The second layer 325 can include the second cathode active material. An amount of the second cathode active material in the second layer 325 can be greater than an amount of the first cathode active material in the first layer 310.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A cathode, comprising:
a current collector;
a first layer on a first surface of the current collector, the first layer comprising a first cathode active material and an electrically conductive material;
a second layer on the first layer, the second layer comprising a second cathode active material;
an amount of the second cathode active material in the second layer greater than an amount of the first cathode active material in the first layer;
the first layer comprising less than 5 wt % of the first cathode active material;
the second layer comprising at least 94 wt % of the second cathode active material; and
the first cathode active material and the second cathode active material comprising lithium manganese iron phosphate, lithium iron phosphate, or a combination thereof.

2. The cathode of claim 1, wherein:
an interfacial resistance between the second cathode active material and the current collector is decreased compared to a cathode without the first cathode active material in the first layer.

3. The cathode of claim 1, comprising:
the first layer having a thickness of less than 10 μm.

4. The cathode of claim 1, comprising:
the first layer having a thickness of in a range of 0.5 μm to 8 μm.

5. The cathode of claim 1, comprising:
the first layer having a thickness of in a range of 1 μm to 5 μm.

6. The cathode of claim 1, comprising:
the first layer having a first thickness;
the second layer having a second thickness; and
the first thickness less than the second thickness.

7. The cathode of claim 1, comprising:
the first layer comprising less than 5 wt % of the first cathode active material.

8. The cathode of claim 1, comprising:
the first layer comprising the first cathode active material in a range of 1 wt % to 2 wt %.

9. The cathode of claim 1, comprising:
the first cathode active material having a D50 of less than 2 μm.

10. The cathode of claim 1, comprising:
the first cathode active material having a D50 in a range of 0.5 μm to 1 μm.

11. The cathode of claim 1, comprising:
the first cathode active material having D50 less than a D50 of the second cathode active material.

12. The cathode of claim 1, wherein:
the second cathode active material has a surface area of less than or equal to 40 $m^2/g$.

13. The cathode of claim 1, wherein:
the second cathode active material has a surface area in a range of 10 $m^2/g$ to 20 $m^2/g$.

14. A method, comprising:
providing a current collector;
disposing a first layer on a first surface of the current collector, the first layer comprising a first cathode active material and an electrically conductive material;
disposing a second layer on the first layer, the second layer comprising a second cathode active material;
wherein an amount of the second cathode active material in the second layer is greater than an amount of the first cathode active material in the first layer;
wherein the first layer comprising less than 5 wt % of the first cathode active material;
wherein the second layer comprising at least 94 wt % of the second cathode active material; and
wherein the first cathode active material and the second cathode active material comprising lithium manganese iron phosphate, lithium iron phosphate, or a combination thereof.

15. The method of claim 14, wherein the first layer has a thickness of less than 10 μm.

16. The method of claim 14, wherein the first cathode active material has a D50 of less than 2 μm.

17. A cathode, comprising:
a current collector;
a first layer on a first surface of the current collector, the first layer comprising a first cathode active material and an electrically conductive material;
a second layer on the first layer, the second layer comprising a second cathode active material;
an amount of the second cathode active material in the second layer greater than an amount of the first cathode active material in the first layer;
the first layer comprising the first cathode active material in a range of 1 wt % to 2 wt %; and
the first cathode active material and the second cathode active material comprising lithium manganese iron phosphate, lithium iron phosphate, or a combination thereof.

18. The cathode of claim 17, wherein:
the second cathode active material has a surface area of less than or equal to 40 $m^2/g$.

19. The cathode of claim 17, wherein:
the second cathode active material has a surface area in a range of 10 $m^2/g$ to 20 $m^2/g$.

20. The cathode of claim 17, wherein:
the first cathode active material having D50 less than a D50 of the second cathode active material.

* * * * *